(12) United States Patent
Kahn

(10) Patent No.: US 8,779,744 B2
(45) Date of Patent: Jul. 15, 2014

(54) SENSING AND FEEDBACK WITH ENHANCED STABILITY IN A CURRENT MODE CONTROL VOLTAGE REGULATOR

(75) Inventor: Seth Kahn, San Francisco, CA (US)

(73) Assignee: Volterra Semiconductor Corporation, Fremont, CA (US)

( * ) Notice: Subject to any disclaimer, the term of this patent is extended or adjusted under 35 U.S.C. 154(b) by 457 days.

(21) Appl. No.: 12/904,449

(22) Filed: Oct. 14, 2010

(65) Prior Publication Data

US 2012/0025796 A1 Feb. 2, 2012

Related U.S. Application Data

(60) Provisional application No. 61/368,131, filed on Jul. 27, 2010.

(51) Int. Cl.
*G05F 1/565* (2006.01)

(52) U.S. Cl.
USPC ............ 323/285; 323/271; 323/287; 323/316

(58) Field of Classification Search
USPC .................. 323/222, 271, 282, 285–287, 316
See application file for complete search history.

(56) References Cited

U.S. PATENT DOCUMENTS

| | | | |
|---|---|---|---|
| 5,847,554 A | 12/1998 | Wilcox et al. | |
| 6,020,729 A | 2/2000 | Stratakos et al. | |
| 6,160,441 A | 12/2000 | Stratakos et al. | |
| 6,225,795 B1 | 5/2001 | Stratakos et al. | |
| 6,278,264 B1 | 8/2001 | Burstein et al. | |
| 6,445,244 B1 | 9/2002 | Stratakos et al. | |
| 6,462,522 B2 | 10/2002 | Burstein et al. | |
| 6,476,589 B2 | 11/2002 | Umminger et al. | |
| 6,664,774 B2 | 12/2003 | Lethellier | |
| 6,713,823 B1 | 3/2004 | Nickel | |
| 6,765,372 B2 * | 7/2004 | Isham ........................... 323/224 |
| 6,812,682 B2 | 11/2004 | Hachiya | |

(Continued)

OTHER PUBLICATIONS

Linear Technology, "2.5A, 10V, Monolithic Synchronous Step-Down Regulator," LTC3602 (Product Design Brochure), Linear Technology Corporation, 2008, 20 pgs.

(Continued)

*Primary Examiner* — Adolf Berhane
*Assistant Examiner* — Fred E Finch, III
(74) *Attorney, Agent, or Firm* — Weaver Austin Villeneuve & Sampson LLP

(57) ABSTRACT

The disclosed embodiments of voltage regulators incorporate a current mode control architecture. In one embodiment, a voltage regulator includes a power switch having an input and an output. The power switch is configured to provide a first voltage during a first conduction period and a second voltage during a second conduction period. An output filter is coupled between the power switch output and an output terminal to be coupled to a load. An adjustment device is coupled to sense a current sensing voltage corresponding to a current provided to the output filter. The adjustment device is configured to convert the current sensing voltage to an adjusted current sensing voltage, including replacing a current sensing resistance associated with the current sensing voltage with a reference resistance. Control circuitry includes a current sensing input coupled to the adjustment device to sense the adjusted current sensing voltage, and an output in communication with the power switch input. The control circuitry is configured to cause a transition of the power switch from the second conduction period to the first conduction period responsive to the adjusted current sensing voltage.

29 Claims, 7 Drawing Sheets

(56) References Cited

U.S. PATENT DOCUMENTS

| | | | |
|---|---|---|---|
| 7,170,267 B1 | 1/2007 | McJimsey | |
| 7,245,113 B2 | 7/2007 | Chen et al. | |
| 7,282,894 B2 * | 10/2007 | Oswald et al. | 323/224 |
| 7,327,130 B1 * | 2/2008 | Giannopoulos et al. | 323/285 |
| 7,764,054 B1 | 7/2010 | Guo et al. | |
| 8,018,208 B1 | 9/2011 | Kahn et al. | |
| 8,120,342 B1 | 2/2012 | Kahn et al. | |
| 8,283,902 B1 | 10/2012 | Kahn et al. | |
| 8,368,363 B2 * | 2/2013 | Nishida | 323/225 |
| 2004/0051510 A1 | 3/2004 | Saggini et al. | |
| 2004/0070382 A1 | 4/2004 | Walters et al. | |
| 2005/0035748 A1 * | 2/2005 | Inn | 323/285 |
| 2005/0200343 A1 | 9/2005 | Ueda | |
| 2006/0220627 A1 | 10/2006 | Koh | |
| 2007/0152647 A1 * | 7/2007 | Liao | 323/282 |
| 2007/0285074 A1 | 12/2007 | Maekawa et al. | |
| 2008/0088289 A1 | 4/2008 | Fogg et al. | |
| 2008/0129264 A1 | 6/2008 | Moussaoui et al. | |
| 2008/0130330 A1 * | 6/2008 | Tao | 363/74 |
| 2009/0153127 A1 * | 6/2009 | Chen | 323/350 |
| 2009/0322298 A1 | 12/2009 | Nishida | |
| 2010/0127684 A1 * | 5/2010 | Iliasevitch | 323/285 |
| 2010/0213910 A1 | 8/2010 | Chen | |
| 2011/0187340 A1 * | 8/2011 | Deval et al. | 323/285 |
| 2011/0316502 A1 | 12/2011 | Tang et al. | |
| 2012/0025799 A1 | 2/2012 | Kahn et al. | |
| 2012/0038334 A1 | 2/2012 | Peng et al. | |

OTHER PUBLICATIONS

Analog Devices, "Low Duty Cycle, 600 mA, 3 MHz Synchronous Step-Down DC-to-DC Converter," ADP2102 (Product Design Brochure), Analog Devices, Inc., 2007, 24 pgs.

Maxim, "3A, 1MHz, 1% Accurate, Internal Switch Step-Down Regulator with Power-OK," MAX8505 (Product Design Brochure), Maxim Integrated Products, Oct. 2003, 15 pgs.

P.R.K. Chetty, "Switch-Mode Power Supply Design" TAB Professional and Reference Books, Copyright 1986 by TAB Books Inc., 5 pgs.

U.S. Office Action dated Jan. 30, 2013 issued in U.S. Appl. No. 12/904,445.

U.S. Notice of Allowance dated Jul. 19, 2013 issued in U.S. Appl. No. 12/904,445.

Analog Devices, (2009-2010) "Synchronous Current-Mode with Constant On-Time, PWM Buck Controller," ADP1872/ADP1873 (Product Design Brochure), Analog Devices, Inc., 40 pp.

U.S. Notice of Allowance dated Oct. 1, 2013 issued in U.S. Appl. No. 12/904,445.

* cited by examiner

SENSING AND FEEDBACK WITH ENHANCED STABILITY IN A CURRENT MODE CONTROL VOLTAGE REGULATOR

PRIORITY DATA

The present application claims priority to commonly assigned U.S. Provisional Patent Application No. 61/368,131, titled SENSING AND FEEDBACK IN A CURRENT MODE CONTROL VOLTAGE REGULATOR, by Tournatory, et al., filed on Jul. 27, 2010, which is hereby incorporated by reference in its entirety and for all purposes.

BACKGROUND

The present invention relates generally to voltage regulators, and more particularly to the architecture and control mechanisms of switching voltage regulators.

Voltage regulators, such as direct current (DC) to DC converters, are used to provide stable voltage sources for electronic devices and systems. The general purpose of a voltage regulator is to convert a source voltage, such as the voltage of an alternating current (AC) or DC power source, into the operating DC voltage of an electronic device. Efficient DC to DC converters are used for battery management in low power devices, such as laptop notebooks and cellular phones.

Switching voltage regulators, often referred to as switching regulators, are a type of DC to DC converter that convert one DC voltage to another DC voltage with high efficiency. A switching regulator generates an output voltage by converting an input DC voltage into a high frequency voltage, and filtering the high frequency voltage to produce the output DC voltage.

Conventional switching regulators typically include a switch for alternately coupling and decoupling an unregulated input DC voltage source, such as a battery, to a load, such as an integrated circuit. An output filter, typically including an inductor and a capacitor, is coupled between the switch and the load to filter the output of the switch and thus provide the output DC voltage. Power is transmitted through the switch and into the output filter in the form of discrete current pulses. The switching regulator operates on the principle of storing energy in the inductor during one portion of a cycle and then transferring the stored energy to the capacitor in the next portion of the cycle. The output filter converts the current pulses into a steady load current so that the voltage across the load is regulated.

SUMMARY

According to one aspect of the invention, a voltage regulator includes a power switch having an input and an output. The power switch is configured to provide a first voltage during a first conduction period and a second voltage during a second conduction period. An output filter is coupled between the power switch output and an output terminal to be coupled to a load. An adjustment device is coupled to sense a current sensing voltage corresponding to a current provided to the output filter. The adjustment device is configured to convert the current sensing voltage to an adjusted current sensing voltage, including replacing a current sensing resistance associated with the current sensing voltage with a reference resistance. Control circuitry is coupled between the adjustment device and the power switch input. The control circuitry is configured to control switching of the power switch responsive to the adjusted current sensing voltage.

In one implementation, the current sensing voltage represents the current provided to the output filter multiplied by an effective resistance of a component of the power switch, such as a transistor. In this implementation, the current sensing resistance is the effective resistance of the component of the power switch.

Another aspect of the present invention relates to a device for converting a current sensing voltage to an adjusted current sensing voltage. A matching component shares physical characteristics with a current sensing component at which the current sensing voltage is sensed. For example, the current sensing component and the matching component can be transistors, such as field-effect transistors (FETs), formed during the same integrated circuit fabrication process. The matching component has a resistance associated with a resistance of the current sensing component. In some implementations, the matching component resistance can be a scaling factor times the current sensing component resistance. The scaling factor can represent a size ratio between the current sensing component and the matching component.

In this aspect of the present invention, the matching component is coupled to receive a reference current. A first voltage divider unit is coupled to sense a voltage corresponding to the matching component resistance and the reference current. The first voltage divider unit comprises a first voltage dividing component and a second voltage dividing component. A second voltage divider unit is coupled to sense the current sensing voltage. The second voltage divider unit comprises a first voltage dividing component and a second voltage dividing component. A feedback unit is coupled to a control input of the first voltage dividing components. The first voltage dividing component of the second voltage divider unit has an output providing the adjusted current sensing voltage.

Another aspect of the present invention relates to a method for converting a current sensing voltage to an adjusted current sensing voltage. A reference current is received at a matching component sharing physical characteristics with a current sensing component at which the current sensing voltage is sensed. The matching component has a resistance associated with a resistance of the current sensing component. A voltage corresponding to the matching component resistance and the reference current is sensed at a first voltage divider unit comprising a first voltage dividing component and a second voltage dividing component. The current sensing voltage is sensed at a second voltage divider unit comprising a first voltage dividing component and a second voltage dividing component. A feedback unit is coupled to a control input of the first voltage dividing components. The second voltage divider unit has an output providing the adjusted current sensing voltage.

Yet another aspect of the present invention relates to a voltage regulation method. A first voltage is provided during a first conduction period, and a second voltage is provided during a second conduction period. A current sensing voltage is sensed corresponding to a current provided to the output filter. The current sensing voltage is converted to an adjusted current sensing voltage, including replacing a current sensing resistance associated with the current sensing voltage with a reference resistance. A trigger event is determined when a difference between a feedback voltage at the output filter and a reference voltage equals the adjusted current sensing voltage. The trigger event causes a transition from the second conduction period to the first conduction period.

Yet another aspect of the present invention relates to a voltage regulator. A power switch has an input and an output. The power switch is configured to provide a first voltage during a first conduction period and a second voltage during a second conduction period. An output filter is coupled to the power switch output. An adjustment device is coupled to sense a current sensing voltage at a current sensing component having a variable resistance. The current sensing voltage corresponds to a current provided to the output filter. The adjustment device is configured to convert the current sensing voltage to an adjusted current sensing voltage, including replacing a dependence of the current sensing voltage on the current sensing component resistance with a dependence on a reference resistance having less variability than the current sensing component resistance. The adjustment device has a current sensing signal path with an input coupled to receive the current sensing voltage and an output coupled to provide the adjusted current sensing voltage. The current sensing signal path includes no amplifier components. Control circuitry is coupled between the adjustment device and the power switch input. The control circuitry is configured to cause the power switch to transition from the second conduction period to the first conduction period responsive to the adjusted current sensing voltage.

A further understanding of the nature and advantages of the present invention may be realized by reference to the remaining portions of the specification and the drawings.

BRIEF DESCRIPTION OF THE DRAWINGS

The included drawings are for illustrative purposes and serve only to provide examples of possible structures and process steps for the disclosed inventive devices, circuits, components, systems, and methods. These drawings in no way limit any changes in form and detail that may be made to the invention by one skilled in the art without departing from the spirit and scope of the present invention.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

The disclosed embodiments of the invention relate to and comprise switching voltage regulators and specific mechanisms to facilitate voltage conversion. Embodiments of the invention are generally described herein in relation to a buck regulator, which converts an input (DC) voltage to a lower output voltage of the same polarity. It should be understood that embodiments of the present invention also encompass boost regulators, in which the output voltage is higher than the input voltage, and buck-boost regulators, which incorporate elements of both buck regulators and boost regulators and are capable of reversing the polarity of the input voltage.

Voltage regulators constructed in accordance with some embodiments of the present invention incorporate a power switch to control the flow of current into the output filter. The power switch is generally configured to alternatively couple the output filter to a supply voltage, that is, an input voltage source to be regulated, and another voltage, which is often ground.

In one embodiment, the power switch incorporates a "high side" switch component, such as a transistor, and a "low side" switch component, such as a transistor or a diode. In one embodiment, the high side switch component is coupled to the supply voltage, while the "low side" switch component is connected to ground. As used herein, an individual high side or low side switch component can be referred to as a high side or low side "switch." In this embodiment, the high side switch selectively couples the output filter to the supply voltage, while the low side switch selectively couples the output filter to ground. The ratio of time spent with the "high side" switch enabled versus the "low side" switch enabled determines the output voltage developed, for instance, by an LC output filter coupled at the output of the power switch.

Figure 1:
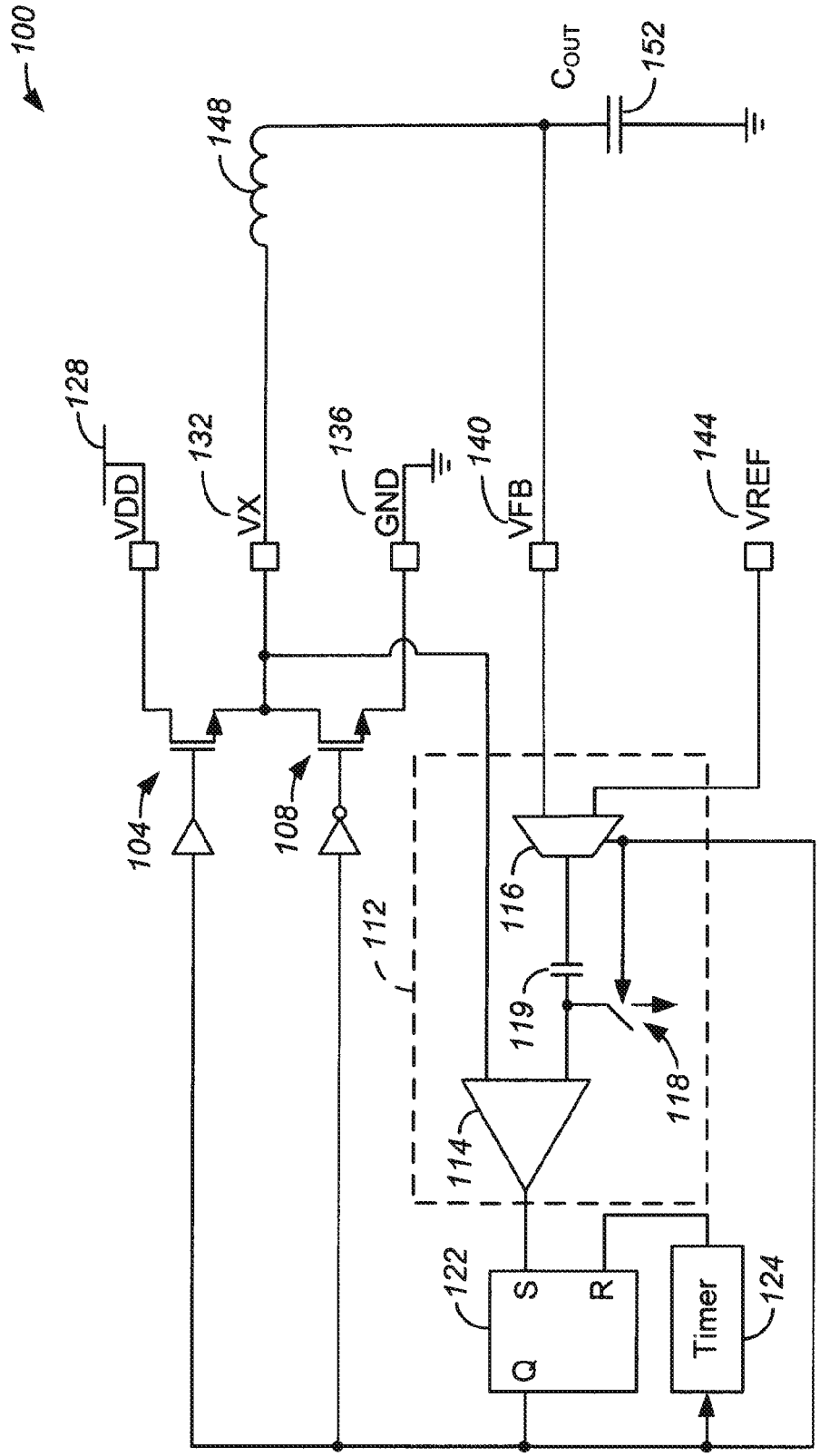
FIG. 1 is a circuit diagram of the main components of a voltage regulator 100, according to an embodiment of the invention.

A power switch transistor can be implemented as a field effect transistor ("FET"), such as a metal oxide semiconductor field effect transistor ("MOSFET"), as illustrated in FIG. 1. The FETs can be p-channel or n-channel, depending on the desired implementation. In an alternative embodiment, a different type of transistor is used, such as a junction gate field effect transistor ("JFET").

FIG. 1 illustrates the major components of a buck voltage regulator 100, constructed according to one embodiment of the invention. In FIG. 1, selected feedback signals are supplied to a comparator mechanism 112. The voltage regulator 100 is constructed with a high side FET (switch) 104 and a low side FET (switch) 108 as described above. The high side switch 104 is coupled to an input voltage source to be regulated ("$V_{DD}$") 128, while the low side switch 108 is coupled to Ground ("Gnd") at node 136. A switching node Vx 132 is situated at the output of the power switch comprising high side switch 104 and low side switch 108. In particular, node Vx is located between the high side FET 104 and low side FET 108, in this implementation, between the source of FET 104 and the drain of FET 108. The Vx node leads to inductor 148 and output capacitor 152 which are considered at least part of an output filter. The output filter is generally coupled to a load (not shown) such as an integrated circuit.

In FIG. 1, the current delivered to the inductor 148 of the output filter through node Vx 132, referred to herein as "$I_L$," ramps up and down in sequence with the switching between high side FET 104 and low side FET 108 of the power switch. In particular, when the high side FET 104 is turned on, $I_L$ ramps up, and when the low side FET 108 is turned on, $I_L$ ramps down.

The comparator mechanism 112 directly monitors particular signals of interest to determine when to execute the low to high side FET transition at the power switch. In one embodiment, comparator mechanism 112 comprises a comparator 114 and a multiplexer 116, and also incorporates an ancillary switch 118 and a capacitor 119, connected as shown in FIG. 1. The comparator 114 is preferably a high-speed comparator. The comparator mechanism 112 has three input terminals, two of which are voltage inputs, and the third being a current sensing input. The first voltage input terminal of comparator mechanism 112, also an input to multiplexer 116, is connected to a reference voltage ("$V_{REF}$") 144, and the second voltage input terminal of comparator mechanism 112, also the second input of multiplexer 116, is connected to the feedback voltage $V_{FB}$ from the output filter comprising inductor 148 and capacitor 152.

In FIG. 1, the comparator mechanism 112 is constructed as a switched capacitor network with multiple phases of operation. In the context of circuit 100, during the idle phase, when the high side FET 104 is on, i.e., high side conduction period, $V_{REF}$ is sampled and output by multiplexer 116 at the input to capacitor 119. Also during the idle phase, switch 118 is closed so the output of capacitor 119 (and voltage input to comparator 114) is held to ground. Thus, capacitor 119 stores the charge corresponding to the magnitude of the reference voltage. In the next phase, when the low side conduction period is initiated, that is, when the low side FET 108 is on, the switch 118 is opened, the reference voltage $V_{REF}$ is essentially disconnected, and the capacitor 119 continues to hold the stored charge of $V_{REF}$. During the low side conduction period, the multiplexer 116 outputs $V_{FB}$ as the input to capacitor 119, so the output of capacitor 119 now reflects the difference of $V_{FB}-V_{REF}$.

In FIG. 1, comparator mechanism 112 is referred to herein as a "sample and hold comparator," because the reference voltage $V_{REF}$ is being sampled by capacitor 119. That is, when the difference of $V_{FB}-V_{REF}$ is calculated at the voltage input to comparator 114, $V_{REF}$ is a sampled value.

Configuring comparator mechanism 112 as described above creates an effective threshold of ($V_{FB}-V_{REF}$) for static $V_{REF}$ inputs at the comparator mechanism 112. The third comparator mechanism input terminal, the current sensing input, is an input to comparator 114 and monitors the current $I_L$ delivered through inductor 148 of the output filter. In one embodiment, as illustrated in FIG. 1, the voltage drop across the low side FET 108, that is, between Vx node 132 and Gnd 136, is provided to the current sensing input as a measure proportional to inductor current $I_L$ across inductor 148. In this embodiment, the voltage drop across the low side FET 108 will be equal to the current through inductor 148, $I_L$, as processed with, for example, multiplied by, the known resistance across the source and drain of the low side FET 108 ("$R_{DSON}$"). Other alternative embodiments providing a measure of the current $I_L$ delivered to the output filter are contemplated. In one alternative embodiment, a resistor is coupled to provide a measure of the current $I_L$. For example, a resistor can be coupled in series with inductor 148, and the voltage across this resistor is provided to the current sensing input of comparator 114. This additional resistor can be an external sense resistor coupled to the output filter, or the resistor could be integrated as a component of the output filter or of the power switch, depending on the desired configuration. In these alternative embodiments incorporating a resistor as the current sensing component, the resistance of the additional resistor is used in place of the $R_{DSON}$ value in the calculations described herein. In another alternative embodiment, the voltage across inductor 148 is measured and delivered to the current sensing input of comparator 114, with an effective resistance value of inductor 148 substituted for the $R_{DSON}$ value in the calculations below.

The comparator mechanism 112 will therefore trigger when the difference between the feedback voltage input and the reference voltage input equals the voltage at the current sensing input, referred to herein as a "trigger event" or "triggering event," as represented below:

$$(V_{FB}-V_{REF})=-I_L \cdot R_{DSON}$$

$$V_{FB}=V_{REF}-I_L \cdot R_{DSON}$$

In FIG. 1, the output of comparator mechanism 112 is coupled to a state machine register 122, which is in turn coupled to a timer block 124. The state machine register 122 and timer 124 cooperate to control the switching of high side switch 104 and low side switch 108. In one embodiment, register 122 is an SR latch with timer 124 connected to the "R" reset input. The "Q" output of register 122 is coupled to both: (1) the select line of multiplexer 116, and (2) the switches 104 and 108. Because the output of register 122 is also coupled to the select line of multiplexer 116, the sampled input and output of the multiplexer is controlled by the same mechanism that causes the selection of the high side switch 104 or the low side switch 108. In addition, the output of register 122 is coupled to both: (3) switch 118, to synchronize the opening of switch 118 during the low side conduction period and closing of switch 118 during the high side conduction period, and (4) an input to timer 124 to signal a reference time, a fixed time after which the timer 124 will activate.

In FIG. 1, the output of comparator 114 goes from low to high when the trigger event occurs. That is, when the low side FET 108 is on, and the inductor current signal $I_L$ crosses the voltage error signal $V_{FB}-V_{REF}$, the comparator 114 output goes to '1,' causing the register 122 to be set. When register 122 is set, in the example of an SR latch, the Q output goes high, turning on the high side FET 104. Responsive to the Q output going high, the timer 124 will activate the R input of register 122 a fixed time later to reset the latch back to '0' at the Q output and initiate the low side conduction period, i.e., turn on the low side FET 108. In this way, regulator 100 is provided with a fixed high side (104) on time. The low side (108) on time, however, varies to provide the desired regulation.

The output of comparator 114 and, therefore, comparator mechanism 112, causes latch 122 to trigger a low to high FET switching transition at high side and low side switches 104 and 108 when the error in the regulated output voltage ($V_{FB}-V_{REF}$) is equal to a proportionally scaled value of the output inductor current, in the embodiment of FIG. 1, $I_L*R_{DSON}$. This method of control is known as current mode control since information regarding the regulator's output current is used to help establish the deterministic switching behavior of the voltage regulator. Current mode control provides regulation of the output voltage using the output current through the output filter and through the load. Embodiments of the present invention that incorporate current mode control protect the regulator 100 from delivering excessive current and provide superior regulator performance by considering both output current and output voltage in determining the cycle-to-cycle control of the power FET state.

In particular, embodiments of the present invention incorporate principles of valley current mode control, which involves leaving the low side FET 108 on until the output current $I_L$ ramps down to a sufficiently low value to trigger the end of the low side conduction period. In one embodiment, output voltage regulation is achieved by combining this valley current mode control technique with fixed on time of the power switch. That is, the high side FET 104 is switched on for a fixed amount of time. In one example, the on time of the high side FET 104 is set by a timer so that it does not change. With fixed on time, the actual on time of the high side FET 104 can be programmed or set as desired, but is generally not controlled. In one embodiment, applying principles of valley current mode control, however, the switching of low side FET 108 is controlled. After the high side FET 104 is disabled, the low side FET 108 is enabled and left to conduct until the combination of the output voltage error (from the reference) and the current sense feedback indicates the low side FET should be disabled and the high side FET should be re-enabled.

In an alternative embodiment of the present invention, the timer 124 of FIG. 1 is replaced with clock having a constant frequency. In this embodiment, the activation of the R input of register 122 to reset the register and initiate the low side conduction period is controlled by the steady clock signal. The frequency of the clock can be programmed or set as desired.

As mentioned above, in an embodiment implementing valley current mode control, the low side FET 108 is left on until the output current ramps down to a sufficiently low value to trigger the end of the low side conduction period. While embodiments of the invention are often described herein with regard to valley current mode control, other control techniques such as such as peak current mode control or hysteretic current mode control may also be utilized. For instance, peak current control can be employed when the voltage error signal is proportional to the intra-cycle peaks of the sensed current. This would generally involve the modulation being done during the high side FET 104 conduction period, and the current sensing therefore being performed across high side FET 104. In an embodiment based on hysteretic current mode control, an additional comparator mechanism, constructed in similar fashion as comparator mechanism 112 or 200, can have a current sensing input coupled at the output of high side FET 104 to respond at the appropriate time by switching from the high side conduction period to the low side conduction period.

Other implementations incorporating aspects of the present invention perform current sensing using other techniques that are not based on the FET 104 or FET 108 $R_{DSON}$ value. For instance, current sensing can be based on inductor DC resistance, explicit sense resistors, and other active circuitry measuring the current $I_L$ being passed to inductor 148 of the output filter.

Figure 2:
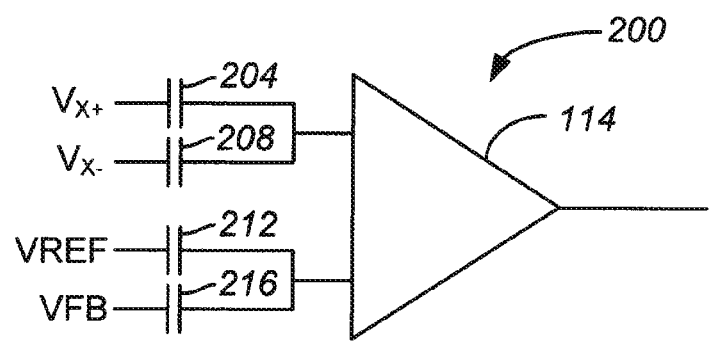
FIG. 2 is a circuit diagram of an alternative embodiment of a comparator mechanism 200 of voltage regulator 100 and associated input signals, according to an embodiment of the invention.

As an alternative to regulator 100 depicted in FIG. 1, another embodiment of comparator circuitry can continuously track $V_{REF}$ rather than use the sample and hold technique described above. Such a design may be referred to as a "double differential" design, and a mechanism of comparator circuitry 200 shown in FIG. 2 replaces comparator mechanism 112 of FIG. 1. In the embodiment of FIG. 2, four input capacitors 204, 208, 212, and 216 replace the multiplexor 116, capacitor 119 and switch 118 of comparator mechanism 112, while the remainder of the circuitry of the regulator would otherwise be like that as shown in FIG. 1 and as described above. In this case, comparator mechanism 200 will continuously track $V_{REF}$ during the comparison phase so that dynamic changes of the reference voltage can be accommodated before the next comparison cycle.

In FIG. 2, the comparator mechanism 200 is utilized for differential sensing of the current feedback ($V_{x+}-V_{x-}$) at switching node 132 of FIG. 1 to account for variations in the relative grounding of the current feedback and voltage feedback signals. A separate capacitor 204 is coupled at the $V_{x+}$ input to comparator 114, and another capacitor is coupled at the $V_{x-}$ input to comparator 114. In FIG. 2, in one embodiment based on valley current mode control, $V_{x+}$ refers to node 132 in FIG. 1 labeled Vx, and $V_{x-}$ refers to node 136 connected to the source of the low side FET 108 in FIG. 1. Thus, the current sensing differential voltage ($V_{x+}-V_{x-}$) is measured across low side FET 108. In an alternative embodiment based on peak current mode control, the differential voltage across high side switch 104 is monitored; thus, $V_{x+}$ refers to node 132 and $V_{x-}$ refers to node 128, or $V_{DD}$. Alternatively, as described above with reference to FIG. 1, the current sensing differential voltage ($V_{x+}-V_{x-}$) can be sensed across the inductor 148 of the output filter or across a resistor, such as an external sense resistor, coupled in series with inductor 148. In FIG. 2, separate capacitors 212 and 216 are coupled at the $V_{REF}$ and $V_{FB}$ inputs, respectively, to provide for sensing a differential voltage at an input of comparator 114, as shown in FIG. 2. The comparator 114, therefore, is coupled to monitor the differentials between the voltage and current-sensed signals and trigger when the difference between the feedback voltage input and the reference voltage input ($V_{FB}-V_{REF}$) equals the voltage at the current sensing input ($V_{x+}-V_{x-}$).

Figure 3A:
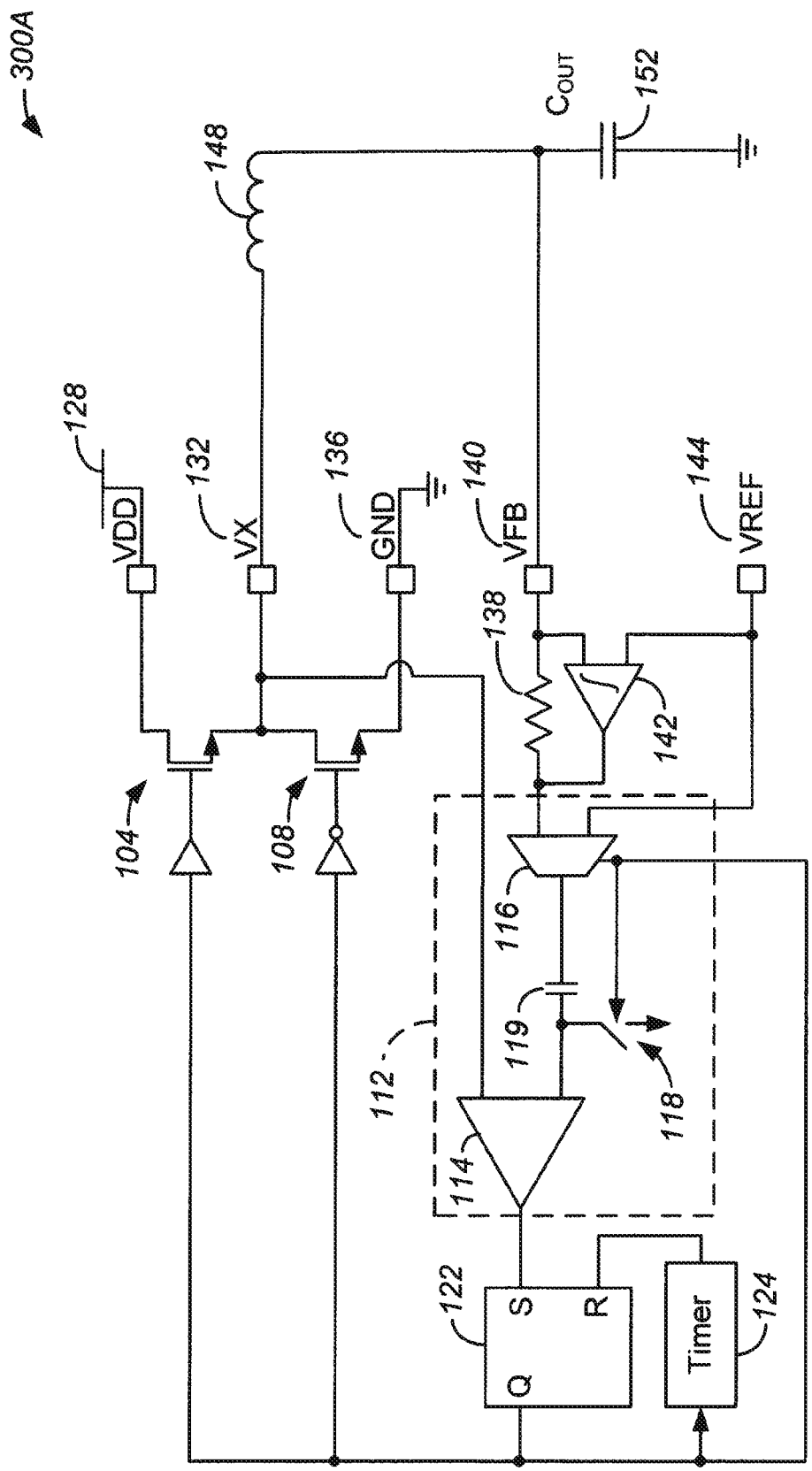
FIG. 3A is a circuit diagram of the main components of a voltage regulator 300A, according to an embodiment of the invention.
Figure 3B:
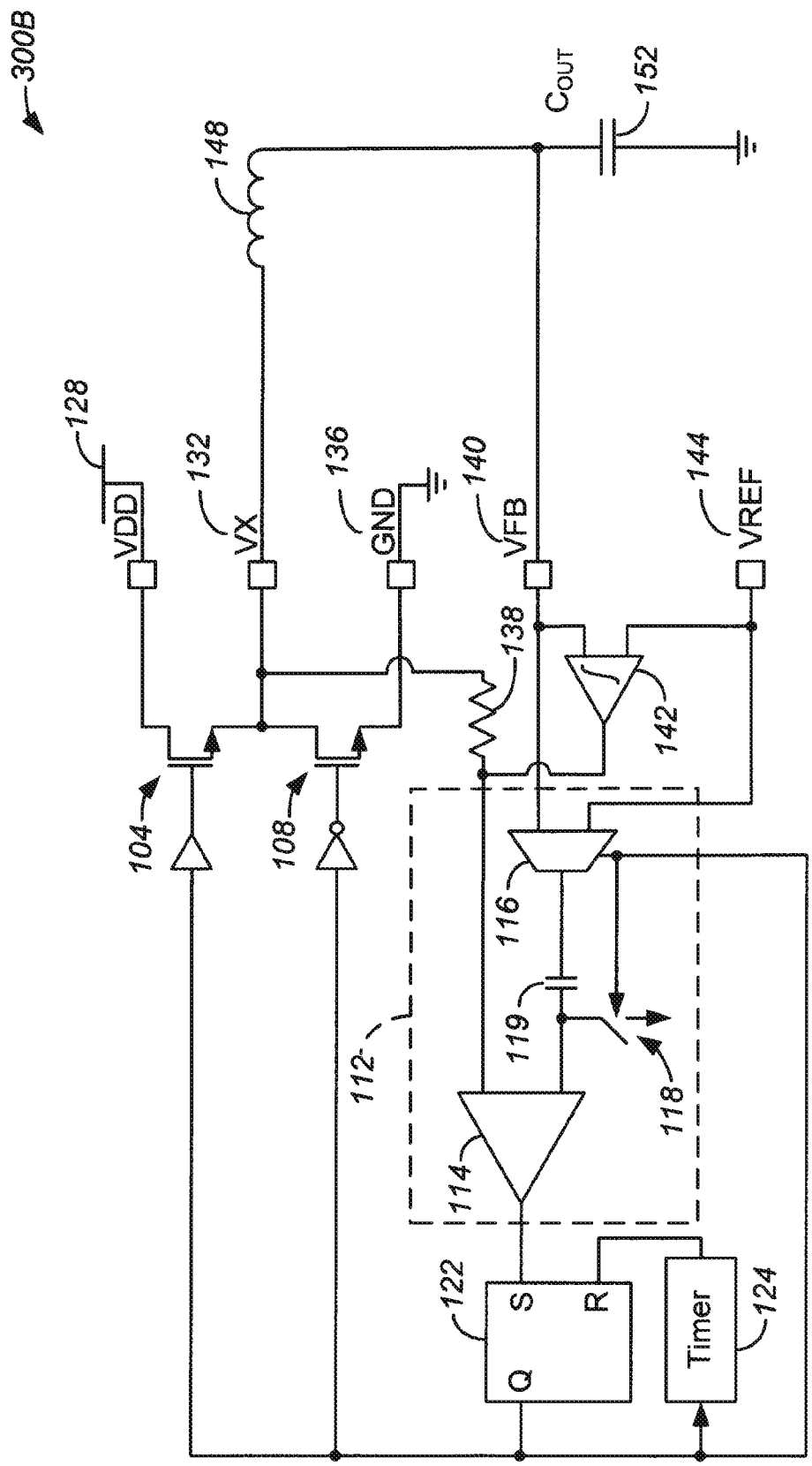
FIG. 3B is a circuit diagram of the main components of a voltage regulator 300B, according to an embodiment of the invention.

FIGS. 3A and 3B are schematic diagrams of voltage regulators 300A and 300B, respectively, constructed according to embodiments of the invention.

Regulators 300A and 300B are similar to regulator 100 in many respects, with like reference numerals indicating like parts, but differ from regulator 100 by the addition of alternative embodiments of a slow speed integrator mechanism comprising an integrator to eliminate the finite output impedance of the current mode voltage regulator 100. The integrator mechanism, described in greater detail below, adds an integrative term with high gain to boost the overall gain back to near-zero error, and does so with a slower response time.

In the embodiments of FIGS. 3A and 3B, the integrator mechanism comprises integrator 142 in conjunction with a resistor 138. In FIG. 3A, one input terminal of the integrator 142 is coupled to the reference voltage 144, and the other input terminal is connected to the feedback voltage 140. The output of integrator 142 is connected to the second voltage input of the multiplexer 116. The resistor 138 is coupled in the feedback voltage path 140 at the second voltage input of the multiplexer 116. FIG. 3B illustrates an alternative construction of the integrator mechanism, in which the input terminals of the integrator 142 are similarly coupled to the reference voltage and the feedback voltage. However, in FIG. 3B, the second voltage input terminal of multiplexer 116 remains directly connected to the feedback voltage 140, while the output of integrator 142 is coupled to the current sensing input of comparator mechanism 112. The resistor 138 is coupled between the current sensing input of comparator mechanism 112 and the node Vx.

In FIGS. 3A and 3B, integrator 142 senses the feedback voltage and reference voltage and is configured to minimize the difference between these sensed voltages. The integrator 142 outputs an integrative correction signal, a current in the example of FIGS. 3A and 3B, into resistor 138 that causes a voltage drop that provides an adjusted signal to the comparator mechanism 112. In FIG. 3A, the adjusted signal is provided at the second voltage input of multiplexer 116. In FIG.

3B, the adjusted signal is provided at the current sensing input of comparator mechanism 112. Both architectures of FIGS. 3A and 3B provide a static offset to the comparator mechanism 112.

Embodiments of the present invention as constructed in FIGS. 3A and 3B utilize the integrative elements 138 and 142 to inject a correction term into the regulator architecture to account for the finite impedance of the current mode regulator. The correction term need not be implemented as shown in the depicted embodiments, as a correction term may be introduced at any number of points in a regulating circuit (via an integrator, etc.)

The circuits and methods described with reference to FIGS. 3A and 3B are two of many possible implementations for introducing an integrative correction signal into a voltage regulator. For example, in an alternative embodiment to FIG. 3A, resistor 138 is coupled between $V_{REF}$ and the integrator output rather than between $V_{FB}$ and the integrator output. In this way, the output of the integrator mechanism is coupled to the reference voltage input. In another alternative embodiment, rather than connecting the integrator in a feedback configuration as shown in FIGS. 3A and 3B, the integrator output could be coupled directly to comparator 114 so the integrative correction signal adjusts the threshold of comparator 114. This represents an alternative to introducing the integrative correction signal into one of the input signals to the comparator, in the embodiments described above.

Regulators incorporating an integrator mechanism are capable of operating with zero static output impedance, in other words, without an inherent drop in output voltage as the load current increases (known as droop). This allows incorporation of the regulator in larger systems where zero or minimal droop is specified. Because the integrator is not in a high speed feedback path, it can be implemented in smaller area and with lower current consumption than designs incorporating a conventional feedback error amplifier approach. Also, since the integrator is only removing the finite error due to current mode control and not performing the high speed feedback signal processing and modulation, the integrator and the overall regulator can be designed in a relatively small area and with limited supply current consumption.

In some of the embodiments described above, in which it is desirable to sense the output current $I_L$ during the low side conduction period, current sensing is achieved by monitoring the voltage at switching node Vx 132 at the output of the power switch. This current sensing voltage, in one embodiment, is the voltage across low side FET 108. In an alternative embodiment, in which current sensing is performed during the high side conduction period, the current sensing voltage can be measured across high side FET 104. In either case, the current sensing voltage is generally proportional to the current $I_L$ output through inductor 148 with a scaling factor of the low side FET resistance during that phase of operation, that is, when the low side FET is on. In an alternative embodiment, in which current sensing is performed during the high side conduction period, the current sensing voltage would be measured when the high side FET is on, with a scaling factor of the high side FET resistance.

One issue with measuring current by sensing the voltage across a transistor or other component is that the effective resistance of the transistor, e.g., $R_{DSON}$, is a factor. From lot-to-lot, and over the lifetime of production, the characteristics of a FET can vary. This includes the resistance of the transistor, for instance, depending on when it is manufactured ("process" parameter). In addition, the resistance can change in response to temperature variations ("temperature" parameter), since a FET has a temperature coefficient for its resistance. The resistance can also change in response to different supply voltages—the resistance generally decreases as the supply voltage increases ("voltage" parameter). Each of these process-voltage-temperature (PVT) parameters contributes to fluctuations in the resistance of the FET. Thus, in some embodiments in which PVT variations could be an issue, it is desirable to sense the output current $I_L$ in a manner that is independent of the resistance across a FET or other component at which the current is monitored.

Figure 4:
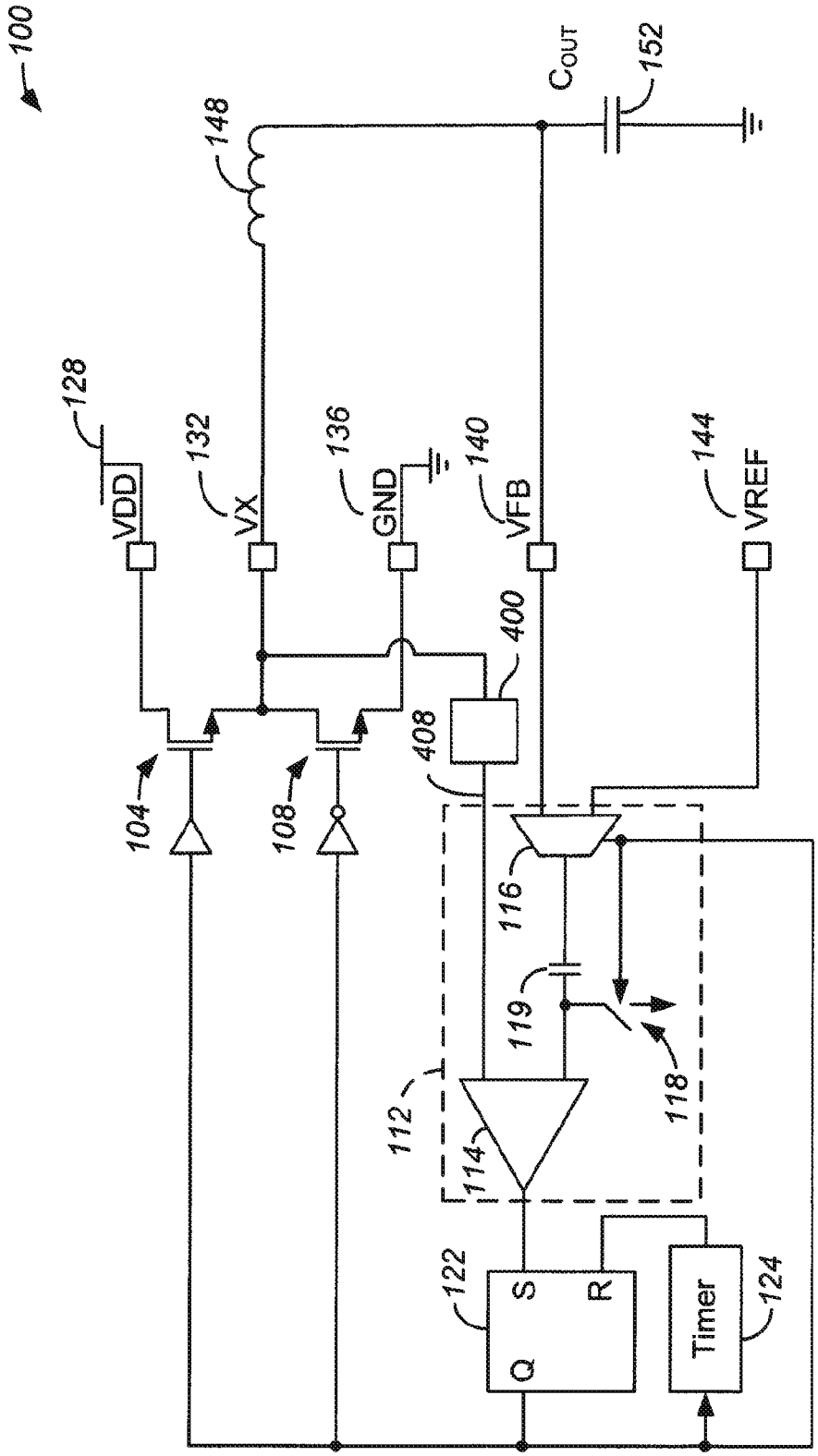
FIG. 4 is a circuit diagram of the main components of voltage regulator 100, configured according to another embodiment of the invention.

In one embodiment, in FIG. 4, a resistance adjustment device 400 can be constructed using integrated circuit fabrication techniques and incorporated as a component of the voltage regulators described above. The resistance adjustment device 400 can be coupled between the node at which the current sensing voltage is measured, node Vx 132 in this example, and the current sensing input(s) of comparator mechanism 112 or comparator mechanism 200 of FIG. 2. As described in greater detail below, resistance adjustment device 400 is configured to enable current sensing in a manner independent of the resistance associated with a component at which the current sensing voltage is measured, such as the $R_{DSON}$ value of low side FET 108. Such a component is referred to herein as a "current sensing component." A resistance adjustment device 400 constructed in accordance with embodiments of the present invention senses the voltage across the current sensing component and performs operations to effectively replace the resistance of the component with a reference resistance, thus canceling out possible resistance variations as described above.

Figure 5:
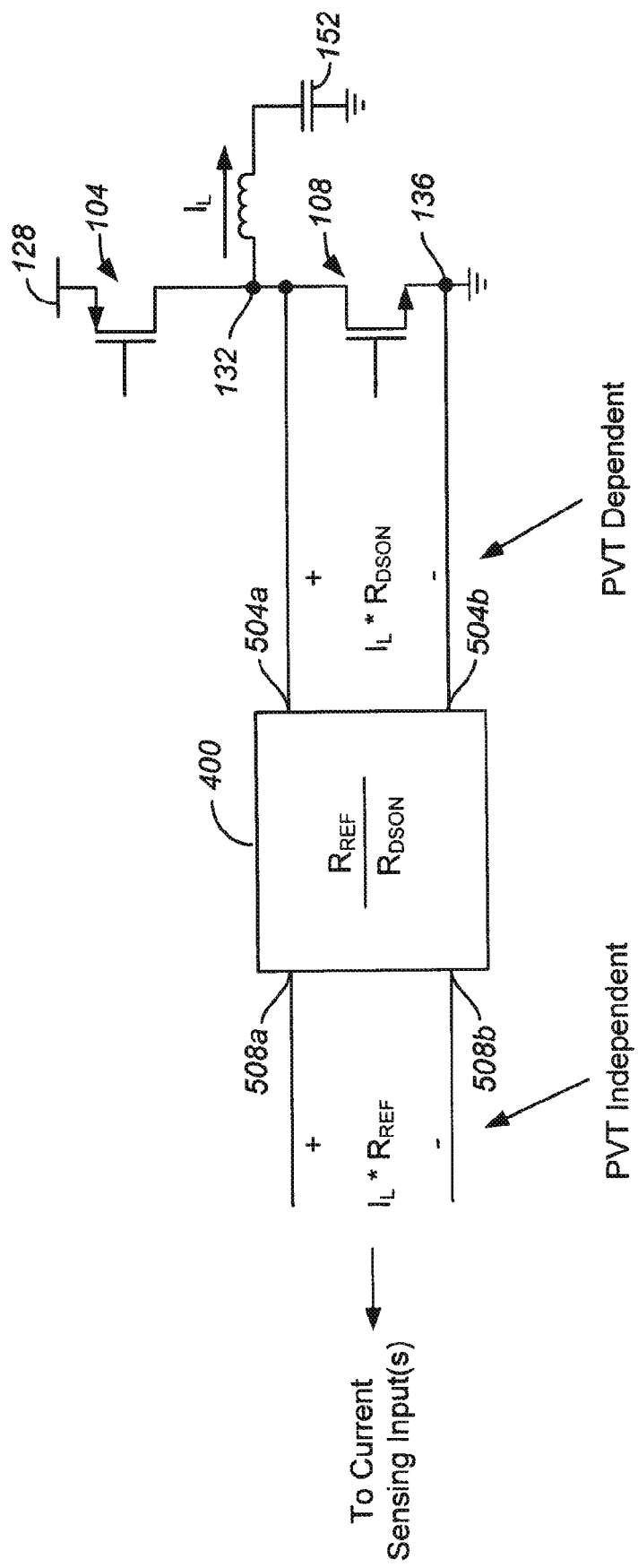
FIG. 5 is a circuit diagram of a resistance adjustment device 400 connected to a current sensing component of a voltage regulator, according to an embodiment of the invention.

FIG. 5 shows a diagram of one implementation of resistance adjustment device 400 with a first input 504a coupled to switching node 132 and a second input 504b coupled to terminal 136 of circuit 100. In this way, a differential voltage of $I_L*R_{DSON}$, measured across low side FET 108, is provided as an input to resistance adjustment device 400. In this example, the resistance of low side FET 108 is desired to be removed from the calculations described herein to measure the output current $I_L$. In other examples, when the current $I_L$ is measured across another current sensing component, for instance, high side FET 104, the inputs 504a and 504b of resistance adjustment device 400 can be connected across that component, e.g., at $V_{DD}$ node 128 and Vx node 132 to remove the variation in its resistance from the current sensing calculations described herein. Resistance adjustment device 400 further includes output terminals 508a and 508b connected to the current sensing input 408 of comparator mechanism 112, as shown in FIG. 4 or to the differential current sensing inputs $V_{x+}$ and $V_{x-}$ of comparator mechanism 200, shown in FIG. 2.

In FIG. 5, resistance adjustment device 400 performs a transfer function in which a factor of $R_{REF}/R_{DSON}$ is applied to the input voltage provided at terminals 504a and 504b. Thus, in one embodiment, resistance adjustment device 400 converts the sensed voltage of $I_L*R_{DSON}$ to $I_L*R_{REF}$, a measure which is based on a predetermined reference resistance, rather than the potentially variable $R_{DSON}$ value of the current sensing component, in this case, low side FET 108. In this embodiment, the adjusted voltage $I_L*R_{REF}$ is provided to the current sensing input(s) of the comparator mechanism 112 or 200 in place of the current sensing voltage measured across low side FET 108. The reference resistance, $R_{REF}$, is generally a controllable constant, as described in greater detail below, thus providing a more stable current sensing voltage measurement across possible PVT variations. That is, the scaled $I_L*R_{REF}$ value can be PVT independent. In some implementations, as further described below, the $R_{REF}/R_{DSON}$ transfer function of resistance adjustment device 400 effectively divides the current sensing voltage down to a smaller but determinable level.

Figure 6:
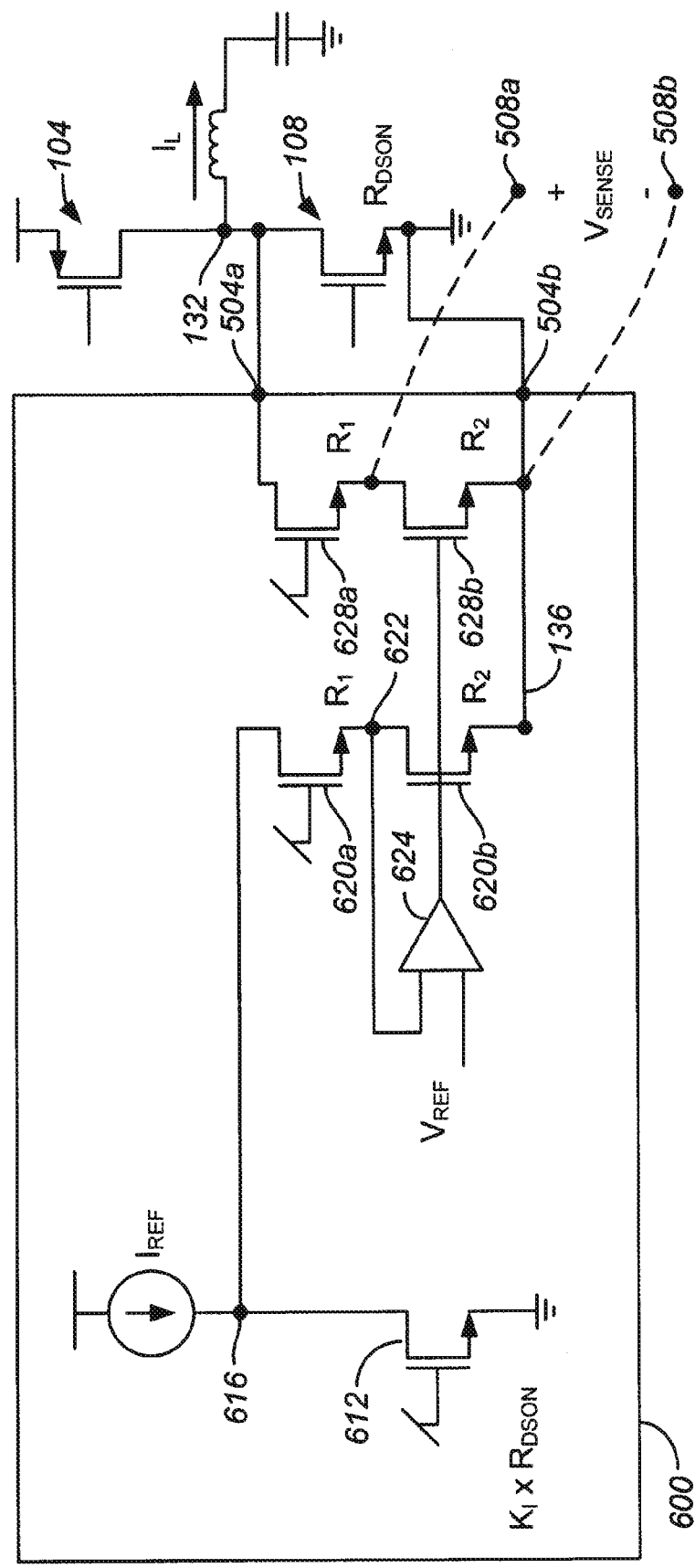
FIG. 6 is a circuit diagram of a circuit 600 as one implementation of resistance adjustment device 400, according to an embodiment of the invention.

FIG. 6 shows a diagram of a circuit 600 configured to sense the voltage across a current sensing component, in this example, low side FET 108, in a manner that is independent of possible resistance variations associated with that switching component. The circuit 600 allows for the current measured across a component having a resistance susceptible to PVT variations to be replicated with a determinable scaling factor, $K_I$. The circuit 600 represents one implementation of a resistance adjustment device 400 configured to replicate the current passing through the switching component of the power switch or other component at which the output current $I_L$ is desired to be measured.

In FIG. 6, the circuit 600 incorporates one or more matching components, which share PVT characteristics with the current sensing component at which $I_L$ is measured. The matching component(s) can be identically matched or ratiometrically matched to the current sensing component. In one implementation, as shown in FIG. 6, the matching component is a FET having similar physical characteristics as the low side FET of the power switch. For example, the matching FET may be sized relative to the low side FET such that its resistance is a factor $K_I$ times the resistance of the low side FET. To realize such similarities, the components are preferably built as part of the same integrated circuit fabrication process. For instance, if a matching FET is manufactured at the same time as a FET of the power switch, they will often have the same PVT characteristics. In such contemporaneous fabrications, the matching component and the current sensing component will often share the same process and temperature characteristics, because they are on the same die, and they can be connected to the same voltage supply. This serves to compensate for any PVT fluctuations in the current sensing component, such as low side FET 108, as described in greater detail below.

In FIG. 6, in one embodiment, the circuit 600 uses a scaling factor $K_I$ defined as the physical device size ratio between the current sensing component and a matching component of the resistance adjustment device. In the example of FIG. 6, the physical device size ratio, $K_I$, is determined based on the gate width of the low side FET 108 in relation to the gate width of a matching FET 612. The scaling factor $K_I$ can be a large value in implementations where the physical area occupied by the current sensing component is large in relation to the area occupied by the matching FET.

In the implementation of FIG. 6, matching FET 612 has an effective resistance of $K_I*R_{DSON}$, that is, the scaling factor applied to the effective resistance of low side FET 108. A current reference, $I_{REF}$, is provided as an input to the drain of the matching FET 612. In some implementations, this current reference is provided on-chip with the resistance adjustment device 400. Using appropriate integrated circuit design techniques, $I_{REF}$ can be provided along with a reference voltage, such as $V_{REF}$ described above, as circuit components comprising an integrated circuit. In FIG. 6, at node 616, the voltage is $I_{REF}*K_I*R_{DSON}$.

In FIG. 6, resistance adjustment device 400 incorporates a first voltage divider unit comprising voltage dividing components 620a and 620b. In one embodiment, the voltage dividing components 620a and 620b are implemented as FETs having effective resistances $R_1$ and $R_2$, respectively. In alternative embodiments, other components having effective resistances can be substituted for FETs 620a and 620b shown in FIG. 6. The drain of FET 620a is coupled to sense $I_{REF}*K_I*R_{DSON}$ at node 616. The source of FET 620a is coupled to the drain of FET 620b, at node 622, while the source of FET 620b is connected to node 136, in this implementation, ground. In this way, the voltage dividing components 620a and 620b are configured to divide the voltage, $I_{REF}*K_I*R_{DSON}$, sensed at node 616, across the respective resistances $R_1$ and $R_2$ of the individual components 620a and 620b. The midpoint voltage at node 622 between voltage dividing components 620a and 620b is a ratio of these resistances. For instance, in FIG. 6, the voltage sensed at midpoint node 622 is the input voltage of $I_{REF}*K_I*R_{DSON}$, sensed at node 616 in this example, multiplied by $R_2/(R_1+R_2)$.

In FIG. 6, an amplifier such as op-amp 624 is implemented with a feedback configuration such that its output is coupled to the gate of FET 620b, and a first input to the amplifier is coupled to the reference voltage, $V_{REF}$. The second input of op-amp 624 is coupled to the midpoint node 622 of the first voltage divider unit. By being connected in this manner, the op-amp 624 will adjust its output so its two inputs are equal to one another. Thus, op-amp 624 is operatively coupled to force the voltage at node 622 to the $V_{REF}$ value. In particular, by being coupled to the gate of FET 620b, op-amp 624 will drive the gate voltage and thereby adjust the $R_2$ value so the midpoint voltage at node 622 adjusts to the $V_{REF}$ value. The resistance ratio of the voltage dividing components 620a and 620b can thus be calculated as:

$$\frac{R_2}{R_1 + R_2} = \frac{V_{REF}}{I_{REF} \cdot K_I \cdot R_{DSON}}$$

In other words, the behavior of the first voltage divider unit is governed by the ratio of $V_{REF}$ to $I_{REF}*K_I*R_{DSON}$. To achieve this, the amplifier 624 is operatively coupled as described above to essentially adjust the $R_2$ value of FET 620b, and thus affect the $R_2/(R_1+R_2)$ value, so that $V_{REF}$ is maintained at the midpoint node 622 of the first voltage divider unit.

In alternative embodiments, it is possible to adjust both resistances ($R_1$ and $R_2$) or just $R_1$. For instance, when a wider variation in the $R_{DSON}$ value of FET 108 is expected, it could be desirable to control both $R_1$ and $R_2$ to allow the circuit to operate over a wider range. Various implementations are contemplated to adjust the ratio of $R_1$ and $R_2$ to achieve the desired voltage divider ratio. Either $R_1$ or $R_2$, or both resistances, can be adjusted as desired. Also, various feedback and adjustment circuit topologies can be implemented to actively control a voltage divider unit tuned to attenuate the voltage $I_{REF}*K_I*R_{DSON}$ to $V_{REF}$, with a matching voltage divider unit coupled to sense the $V_X$ voltage, as further described below.

In FIG. 6, the circuit 600 further includes a matching second voltage divider unit, having voltage dividing components corresponding to the components of the first voltage divider unit described above. In one embodiment, the matching voltage divider unit includes voltage dividing components 628a and 628b implemented, in this example, as FETs having effective resistances $R_1$ and $R_2$, respectively. Thus, the effective resistance of FET 628a substantially matches that of FET 620a, and the effective resistance of FET 628b substantially matches that of FET 620b. In alternative embodiments, other components having matching effective resistances can be substituted for these pairs of FETs implemented in the respective voltage divider units.

In FIG. 6, the resistances $R_1$ and $R_2$ of the FETs comprising both the first and second voltage divider units can be independently controlled according to the gate drives at the respective FETs. Thus, for instance, the voltage input to the gate of FET 628a will affect its $R_1$ value. In one implementation of the circuit of FIG. 6, the same voltage, $V_{DD}$, is provided to the gates of FETs 620a and 628a, ensuring that both FETs have substantially the same $R_1$ value. Similarly, the gates of FETs 620b and 628b are coupled to one another so that amplifier 624 drives FET 628b in the same manner as FET 620b, described above. Other control voltages can be provided to the gates of the matching pairs of FETs in other implementations.

In the embodiment of FIG. 6, the drain of FET 628a is coupled to switching node 132, at which the output current $I_L$ is sensed. The source of FET 628a is coupled to the drain of FET 628b, while the source of FET 628b is connected to terminal 504b shared by the sources of low side FET 108 and FET 620b. In this way, the voltage dividing components 628a and 628b of the matching voltage divider unit are configured to divide the current sensing voltage at node 132 across the respective resistances $R_1$ and $R_2$ of the individual components 628a and 628b.

In FIG. 6, because the first and second voltage divider units have substantially matching voltage dividing components and the same gate voltages, the units generally exhibit the same voltage dividing characteristics according to the $R_2/(R_1+R_2)$ ratio. For instance, in FIG. 6, the voltage sensed at output terminals 508a and 508b ($V_{SENSE}$) of this implementation of resistance adjustment device 400 is the current sensing voltage, $I_L*R_{DSON}$ in this example, multiplied by $R_2/(R_1+R_2)$. Because the $R_2/(R_1+R_2)$ value was determined above as $V_{REF}/(I_{REF}*K_I*R_{DSON})$, using the first voltage divider unit, $V_{SENSE}$ can be computed as follows:

$$= I_L \cdot R_{DSON} \cdot \frac{R_2}{R_1 + R_2}$$
$$V_{SENSE} = I_L \cdot R_{DSON} \cdot \frac{V_{REF}}{I_{REF} \cdot K_I \cdot R_{DSON}}$$
$$= I_L \cdot \frac{1}{K_I} \cdot \frac{V_{REF}}{I_{REF}}$$

Thus, the replacement current sensing voltage provided to the current sensing input(s) of comparator mechanism 112 or comparator mechanism 200 is $(I_L*V_{REF})/(I_{REF}*K_I)$, with $R_{DSON}$ having been replaced by the on-chip voltage reference ($V_{REF}$) divided by an on-chip current reference ($I_{REF}$) and an area-based ratio of the current sensing component to the matching component ($K_I$). Returning to FIG. 5, in this implementation, the reference resistance, $R_{REF}$, is the value $V_{REF}/(I_{REF}*K_I)$.

In the embodiment of FIG. 6, the circuit 600 is configured to leverage: a PVT independent voltage reference, a PVT independent current reference, and a matching FET with dimensions $K_I$ times smaller than the current sensing component which the matching FET is intended to replicate. In one implementation, the circuit 600 incorporates an amplifier with matching voltage divider units and modulates the gate drive and, hence, effective resistance, of one or more components in the first voltage divider unit so a node between voltage dividing components of the unit equals the voltage reference. The second voltage divider unit is operatively coupled to divide down the $I_L*R_{DSON}$ value, and the corresponding output is proportional to $I_L$ but independent of $R_{DSON}$.

In alternative embodiments to that described above with reference to FIG. 6, current sensing is performed during the high side conduction period, in which case the current sensing voltage can be measured when the high side FET 104 is on. In these alternative embodiments, principles described above are still applicable. In one embodiment, when high side FET 104 is a p-channel FET rather than an n-channel FET, circuit 600 can be re-configured, as will be appreciated by those skilled in the art, including replacing the re-channel FETs 612, 620a, 620b, 628a, and 628b, of FIG. 6 with appropriately interconnected p-channel FETs. In another alternative embodiment based on high side current sensing, high side FET 104 can remain an n-channel device, and the FETs comprising circuit 600 can remain as n-channel FETs configured substantially the same as shown in FIG. 6. However, in this alternative embodiment, input terminals 504a and 504b of the resistance adjustment device can be coupled across $V_{DD}$ and node Vx 132 rather than being coupled across Vx 132 and ground. Thus, in this alternative embodiment, Vx 132 can be viewed as serving as a virtual ground.

The embodiments described above with reference to FIGS. 5 and 6 provide an essentially passive voltage divider on the current sensing voltage for accurate current sensing, by converting the sensed voltage to a PVT-independent measure based on a predetermined reference resistance rather than the potentially variable $R_{DSON}$ value of the current sensing component. In FIGS. 5 and 6, the conversion is achieved without coupling active components in the signal path between the node at which the current sensing voltage is measured, node Vx 132 in these embodiments, and the current sensing input(s) of comparator mechanism 112 or comparator mechanism 200 of FIG. 2. This signal path is referred to herein as the "current sensing signal path."

In one embodiment, as shown in FIG. 6, the current sensing signal path of circuit 600 has an input at node Vx 132, runs from node 132 to nodes 504a and 504b, and from nodes 504a and 504b to an output at $V_{SENSE}$ nodes 508a and 508b. Only passive components, namely voltage dividing components 628a and 628b of the second voltage divider unit, are coupled in this signal path. While components 628a and 628b are transistors, in one embodiment, these components are configured to operate essentially as resistors to divide down the voltage in the second voltage divider unit. Any active components, namely the amplifier 624 coupled to the gate of FET 620b and FET 628b, are not coupled in the current sensing signal path. The matching FET 612 and current reference, $I_{REF}$, are also not coupled in the current sensing signal path.

Because there are no active components coupled in the current sensing signal path, the speed of the passive voltage divider network can be governed by parasitic elements and have fast response times. The amplifier 624 in the embodiments above does not add any appreciable delay to circuit 600. The amplifier and any associated circuitry can have slower speeds, require smaller area, consume lower supply currents, and be easier to implement than conventional designs, since the circuitry is not in the current sensing signal path.

Depending on the desired implementation, different circuit components/mechanisms described herein can be fabricated so that they share the same substrate, e.g., are on the same die or chip. In an alternative implementation, such circuit components and mechanisms can be fabricated on different substrates, e.g., on different chips. In either implementation, such circuit components and mechanisms can be provided in the same or different packages. For instance, a comparator mechanism fabricated on a first die could be interconnected with a power switch fabricated on a different second die, interconnected with one another as described above, and provided in the same package. In another example, the comparator mechanism, integrator mechanism, or voltage divider unit(s) could be implemented in a discrete controller separate from other circuit components in the embodiments described herein.

While the invention has been particularly shown and described with reference to specific embodiments thereof, it will be understood by those skilled in the art that changes in the form and details of the disclosed embodiments may be made without departing from the spirit or scope of the invention. The present invention should of course, not be limited to the depicted embodiments. In addition, although various advantages and aspects of the present invention have been discussed herein with reference to various embodiments, it will be understood that the scope of the invention should not be limited by reference to such advantages and aspects. Rather, the scope of the invention should be determined with reference to the appended claims.

What is claimed is:

1. A device for converting a current sensing voltage to an adjusted current sensing voltage, the device comprising:
    a matching component sharing physical characteristics with a current sensing component at which the current sensing voltage is sensed, the matching component having a resistance associated with a resistance of the current sensing component, the matching component coupled to receive a reference current;
    a first voltage divider unit coupled to sense a voltage corresponding to the matching component resistance and the reference current, the first voltage divider unit comprising a first voltage dividing component and a second voltage dividing component;
    a second voltage divider unit coupled to sense the current sensing voltage, the second voltage divider unit comprising a first voltage dividing component and a second voltage dividing component; and
    a feedback unit having an output coupled to a control input of the first voltage dividing components, the second voltage divider unit having an output providing the adjusted current sensing voltage.

2. The device of claim 1, the matching component resistance being a scaling factor times the current sensing component resistance.

3. The device of claim 2, the scaling factor representing a size ratio between the current sensing component and the matching component.

4. The device of claim 1, the physical characteristics being process-voltage-temperature (PVT) characteristics.

5. The device of claim 1, the current sensing component and the matching component being transistors.

6. The device of claim 1, the current sensing component and the matching component being field-effect transistors (FETs).

7. The device of claim 1, the current sensing component being a low side FET.

8. The device of claim 1, the current sensing component being a high side FET.

9. The device of claim 1, the voltage dividing components being transistors.

10. The device of claim 1, the voltage dividing components being field-effect transistors (FETs).

11. The device of claim 1, the first voltage dividing components configured to have substantially the same resistance.

12. The device of claim 1, the second voltage dividing components configured to have substantially the same resistance.

13. A method for converting a current sensing voltage to an adjusted current sensing voltage, the method comprising:
    receiving a reference current at a matching component sharing physical characteristics with a current sensing component at which the current sensing voltage is sensed, the matching component having a resistance associated with a resistance of the current sensing component;
    sensing a voltage corresponding to the matching component resistance and the reference current at a first voltage divider unit comprising a first voltage dividing component and a second voltage dividing component;
    sensing the current sensing voltage at a second voltage divider unit comprising a first voltage dividing component and a second voltage dividing component; and
    causing the first voltage dividing component of the first voltage divider unit to output a reference voltage using a feedback unit having an output coupled to a control input of the first voltage dividing components, the second voltage divider unit having an output providing the adjusted current sensing voltage.

14. The method of claim 13, the matching component resistance being a scaling factor times the current sensing component resistance.

15. The method of claim 13, the scaling factor representing a size ratio between the current sensing component and the matching component.

16. The method of claim 13, the physical characteristics being process-voltage-temperature (PVT) characteristics.

17. A voltage regulator comprising:
    a power switch having an input and an output, the power switch configured to provide a first voltage during a first conduction period and a second voltage during a second conduction period at the output;
    an output filter coupled to the power switch output;
    an adjustment device coupled to sense a current sensing voltage at a current sensing component having a variable resistance, the current sensing voltage corresponding to a current provided to the output filter, the adjustment device configured to convert the current sensing voltage to an adjusted current sensing voltage, including replacing a dependence of the current sensing voltage on the current sensing component resistance with a dependence on a reference resistance having less variability than the current sensing component resistance, the adjustment device having a current sensing signal path with an input coupled to receive the current sensing voltage and an output coupled to provide the adjusted current sensing voltage, the current sensing signal path including no amplifier components, and wherein the adjustment device includes a first voltage dividing component of a first voltage divider unit being configured to output a scaled reference voltage, the output of the first voltage dividing component being coupled to a feedback unit having an output coupled to a control input of the first voltage dividing component of the first voltage divider unit and a first voltage dividing component of a second voltage divider unit, the second voltage divider unit having an output providing the adjusted current sensing voltage; and
    control circuitry coupled between the adjustment device and the power switch input, the control circuitry configured to control switching of the power switch responsive to the adjusted current sensing voltage.

18. The voltage regulator of claim 17, the current sensing signal path including:
    one or more voltage dividing components.

19. The voltage regulator of claim 18, the one or more voltage dividing components comprising:
    a transistor.

20. The voltage regulator of claim 18, the one or more voltage dividing components comprising:

a resistor.

21. The voltage regulator of claim 17, the current sensing component resistance being an effective resistance of a component of the power switch.

22. The voltage regulator of claim 17, the adjustment device comprising a matching component having a resistance being a scaling factor times the current sensing component resistance.

23. The voltage regulator of claim 22, the matching component sharing physical characteristics with the current sensing component.

24. The voltage regulator of claim 23, the physical characteristics being process-voltage-temperature (PVT) characteristics.

25. The voltage regulator of claim 17, the control circuitry comprising:

a state register having a control input and an output coupled to the power switch input; and a switching control unit coupled to the control input of the state register;

the state register capable of initiating a transition of the power switch to the second conduction period responsive to the switching control unit.

26. The voltage regulator of claim 25, the switching control unit comprising a timer.

27. The voltage regulator of claim 26, the timer having a fixed on time.

28. The voltage regulator of claim 26, the timer having a variable on time.

29. The voltage regulator of claim 25, the switching control unit comprising a clock.

* * * * *